United States Patent
Funahashi

(10) Patent No.: US 7,180,611 B2
(45) Date of Patent: Feb. 20, 2007

(54) PRINTING DEVICE CAPABLE OF UTILIZING JOB DATA TRANSMITTED FROM HOST COMPUTER FOR MANAGING PRINTING OPERATIONS

(75) Inventor: Hiroyuki Funahashi, Aichi-ken (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1720 days.

(21) Appl. No.: 09/730,390

(22) Filed: Dec. 6, 2000

(65) Prior Publication Data

US 2001/0019426 A1 Sep. 6, 2001

(30) Foreign Application Priority Data

Dec. 6, 1999 (JP) ................................. 11-346123

(51) Int. Cl.
*G06F 3/12* (2006.01)
*G06K 15/00* (2006.01)

(52) U.S. Cl. ..................................... 358/1.13; 358/1.14
(58) Field of Classification Search ......... 358/1.1–1.18
See application file for complete search history.

(56) References Cited

U.S. PATENT DOCUMENTS 6,154,287 A * 11/2000 Nemoto et al. ............. 358/1.15
6,454,377 B1 * 9/2002 Ishizaki ....................... 347/15

* cited by examiner

*Primary Examiner*—Douglas Q. Tran
(74) *Attorney, Agent, or Firm*—Oliff & Berridge, PLC

(57) ABSTRACT

A laser beam printer 1 is connected to a host computer and receives job data 100 from the host computer. The job data 100 includes a transmission time information 103. If the laser beam printer 1 is provided with a clock IC 98, a CPU 91 of the laser beam printer 1 reads a current time from the clock IC 98 and set the current time as receiving time information. On the other hand, if the laser beam printer 1 is not provided with the clock IC 98, then the CPU 91 sets the transmission time information 103 included in the received job data 100 as the receiving time information.

9 Claims, 4 Drawing Sheets

PRINTING DEVICE CAPABLE OF UTILIZING JOB DATA TRANSMITTED FROM HOST COMPUTER FOR MANAGING PRINTING OPERATIONS

BACKGROUND OF THE INVENTION

1. Field of the Invention

The present invention relates to a printing device and a control method of the printing device that uses time data as control data for managing printing data.

2. Description of the Prior Art

There has been provided a conventional printing device including a clock integrated circuit (IC). In this type of printing device, when document data is received or when errors occur, time information is retrieved from the clock IC and stored as a part of log information. Then, the time information is used for managing printing processes or error processes.

Specifically, when a plurality of document data are spooled, the document data are printed based on the log information on in an order in which the document data were received. Also, the spooled document data are deleted based on the log. information at a specified time.

Further, when an error occurs during when document data is being processed, time information is read from the clock IC and stored as the log information. As a result, by referring to the log information, it can be determined during which document data was being processed when the error occurred. This simplifies processes for investigating the cause of the error.

However, because a clock IC is expensive, the clock IC is only offered as an option to users. Accordingly, the above-described log function is not available to the users without a clock IC, in spite of the fact that the printing device itself is capable of possessing the log function. As a result, these printing devices cannot always perform effective error processing or effective printing processing, and are sometimes prevented from performing optimally.

SUMMARY OF THE INVENTION

In view of the foregoing, it is an object of the present invention to provide a printing device and a control method thereof that is capable of utilizing log functions even when the printing device is not equipped with a clock IC.

In order to achieve the above and other objectives, there is provided a printing device including a receiving unit, a. printing unit, a detecting unit, an information unit, and a memory. The receiving unit receives a printing data appended with a time information from an external device. The printing unit is connected to the receiving unit and performs a printing operation to form an image on a recording medium based on the printing data received at the receiving unit. The detecting unit detects whether or not a clock unit exists. The information setting unit sets a control information. When the detecting unit detects that the clock unit exists, the information setting unit retrieves a current time from the clock unit and sets the current time as the control information. When the detecting unit detects that the clock unit does not exist, the information setting unit retrieves the time information appended to the printing data and sets the time information as the control information. The memory that stores the control information. The printing unit performs the printing operation in response to the control information.

There is also provided a control method of controlling a printing device that performs a printing operation The control method includes the steps of a) receiving a printing data appended with a time information, b) detecting whether or not a clock unit is provided in the printing device. c) reading a current time information from the clock unit if it is detected in step b) that the clock unit is provided, d) reading the time information appended to the printing data received in step a) if it is detected in step b) that the clock unit is not provided, e) setting either one of the current time information read in stop c) or the time information read In step d) as a control information, f) storing the control information in a memory, and g) controlling the printing operation in response to the control information.

DETAILED DESCRIPTION OF THE PREFERRED EMBODIMENT

A printing device according to a preferred embodiment of the present invention will be described while referring to the accompanying drawings.

Figure 1:
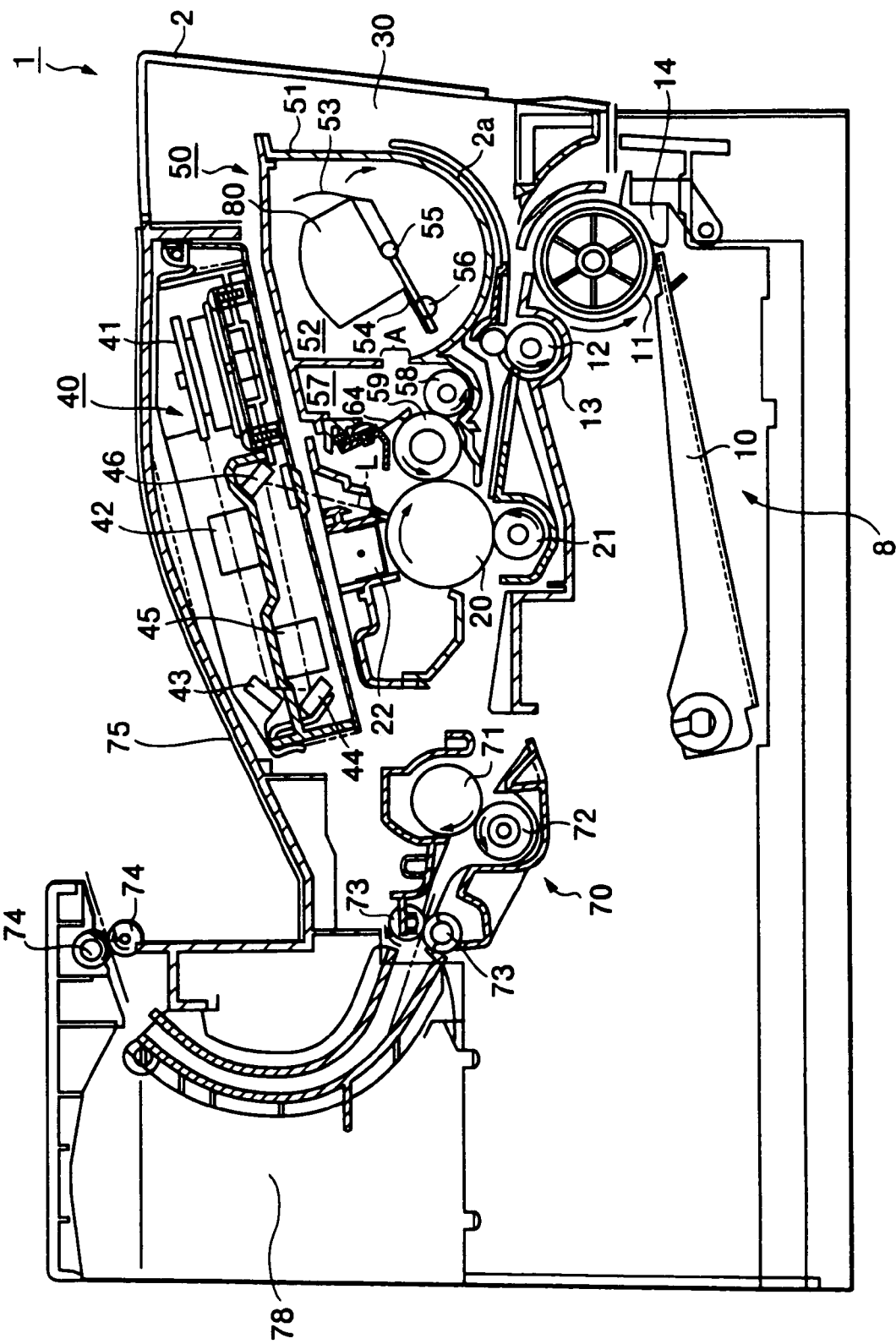
FIG. 1 is a cross-sectional view showing a configuration of a laser beam printer according to an embodiment of the present invention.

First, an overall configuration of a laser beam printer device 1 serving as the printing device of the present invention will be described while referring to FIG. 1. As shown in FIG. 1, the laser beam printer 1 includes a main case 2, a feeder unit 8, a developing unit 30, a fixing unit 70, and a discharge unit 78 aligned in this order in a predetermined sheet feed direction.

The feeder unit S is a disposed on the bottom of the main case 2. The feeder unit 8 includes a paper pressure plate 10, a feed roller 11, a frictional separating member 14, and a pair of register rollers 12 and 13. Although not shown in the drawings, paper sheets are mounted on the paper pressure plate 10 in a stacked manner. The feed roller 11 is disposed near one end of the sheet pressure plate 10 so as to be rotatable in an direction indicated by an arrow in FIG. 1. A spring (not shown) is provided under the paper pressure plate 10 for urging the one end of the paper pressure plate 10 upward toward the feed roller 11 such that the paper sheets on the paper pressure plate 10 will be pressed against the feed roller 11. The frictional separating member 14 is disposed in confrontation with the feed roller 11 for preventing more than one paper sheets from passing therebetween at one time.

The register rollers 12 and 13 are rotatably disposed downstream from the feed roller 11 in the sheet feed direction. Rotation of the feed roller 11 separates the top most paper sheet mounted on the paper pressure plate 10 at a predetermined timing. The separated paper sheet is then transported between the feed roller 11 and the frictional separating member 14 toward the register rollers 12, 13, which in turn transports the paper sheet to the developing unit 30.

The developing unit 30 is disposed further downstream from the register rollers 12, 13 in the sheet feed direction. The developing unit 30 includes a process cartridge 2a, a process cartridge 50, and a laser scanner unit 40. The process cartridge 2a is detachably mounted to the laser beam printer 1 and houses a photosensitive drum 20, a transfer roller 21, and a charger 22. The developing cartridge 50 is detachably mounted inside the process cartridge 2a.

The developing cartridge 50 Includes a case 51 formed with a toner accommodating chamber 52 and a developing chamber 57. The toner accommodating chamber 52 accommodates a toner which is a positively charging non-magnetic single component developing agent having an electrically insulating characteristics. An opening A is formed in the casing 51 between the toner accommodating chamber 52 and the developing chamber 57 so that these two are in a fluid communication with each other. The toner accommodating chamber 52 is provided with an agitator 53, a cleaning member 54, a light blocking member 80, and a rotating shaft 55. The agitator 53, the leaning member 54, and the light blocking member 80 are rotatably provided on the rotating shaft 55. The light blocking member 80 is disposed between the agitator 53 and cleaning member 54. The accommodating chamber 52 has side walls on either side of the rotating shaft 55, and the sidewalls are formed with transparent windows 56.

A supply roller 58 and a developing roller 59 are rotatably supported within the developing chamber 57. The supply roller 58 supplies the toner from the toner accommodating chamber 52 onto the developing roller 59. A thickness regulating blade 64 is provided above the developing roller 59. The thickness regulating blade 64 is formed of a thin elastic plate and regulates the amount of the toner on the developing roller 59, thereby forming a thin toner layer having a predetermined layer thickness on the developing roller 59. In this way, the developing roller 59 supplies the thin toner layer for developing process to be described later.

The photosensitive drum 20 is disposed next to the developing roller 59. The transfer roller 21 is rotatably disposed below and in contact with the photosensitive drum 21, thereby defining a transfer position therebetween. The transfer roller 21 is formed from a conductive foam material, such as silicon or urethane rubber, having an elastic property. A bias voltage is applied to the transfer roller 21.

The photosensitive drum 20 is formed of an organic photosensitive member mainly composed of a positively charging material, such as polycarbonate. More specifically, the photosensitive drum 20 includes a cylindrical hollow sleeve formed of aluminum. The sleeve is grounded and rotatably supported on the main case 2. The outer surface of the sleeve is covered with a photoconductive layer at a prescribed thickness, approximately 20 μm for example. The photoconductive layer is formed of polycarbonate dispersed with a photoconductive resin. The photosensitive drum 20 is driven to rotate in a direction indicated by an arrow in FIG. 1 by a drive motor (not shown).

The charger 22 is a positive charging scorotron type charger that generates a corona discharge from a charging wire formed of tungsten or the like. The corona discharge from the charging wire uniformly charges entire surface of the photosensitive drum 20.

The laser scanner unit 40 is disposed in the top of the main case 2. The laser scanner unit 40 includes a laser generator, (not shown) for generating a laser beam, a rotatably five-sided polygon mirror 41, a pair of lens 42 and 45, and reflecting mirrors 43, 44, 46. The laser scanner unit 40 generates a laser light L modulated according to the image data. The laser light L is irradiated on the uniformly charged surface of the photosensitive drum 20, thereby forming a latent image thereon.

The toner carried on the developing roller 59 is selectively transferred onto the photosensitive drum 20, thereby developing the latent image into a visible toner image. When the toner image is transported to the transfer position between the photosensitive drum 20 and the transfer roller 21 as the photosensitive drum 20 rotates, the toner image is then transferred onto the paper sheet fed from the register rollers 12, 13 because of the bias voltage applied to the transfer roller 21. In this way, the transfer process is performed, and the paper sheet is formed with the toner image. Residual toner remaining on the photosensitive drum 20 after the transfer process is recovered by the developing roller 59 into the developing chamber 57.

The fixing unit 70 is disposed downstream from the photosensitive drum 20 and the transfer roller 21 in the sheet feed direction. The fixing unit 70 includes a heating roller 71 that generates heat and a pressure roller 72 that applies pressure to the heat roller 71. As the paper sheet formed with the toner image is transported between the heating roller 71 and pressure roller 72, the toner image is fixed onto the paper sheet because of the heat and pressure.

A pair of conveying rollers 73 and a pair of discharge rollers 74 are disposed in this order downstream from the fixing unit 70 in the sheet feed direction. A discharge tray 75 is provided downstream from the discharge rollers 74. The paper sheet fed from the fixing unit 70 is discharged via the conveying rollers 73 and the discharge rollers 74 onto the discharge tray 75.

Figure 2:
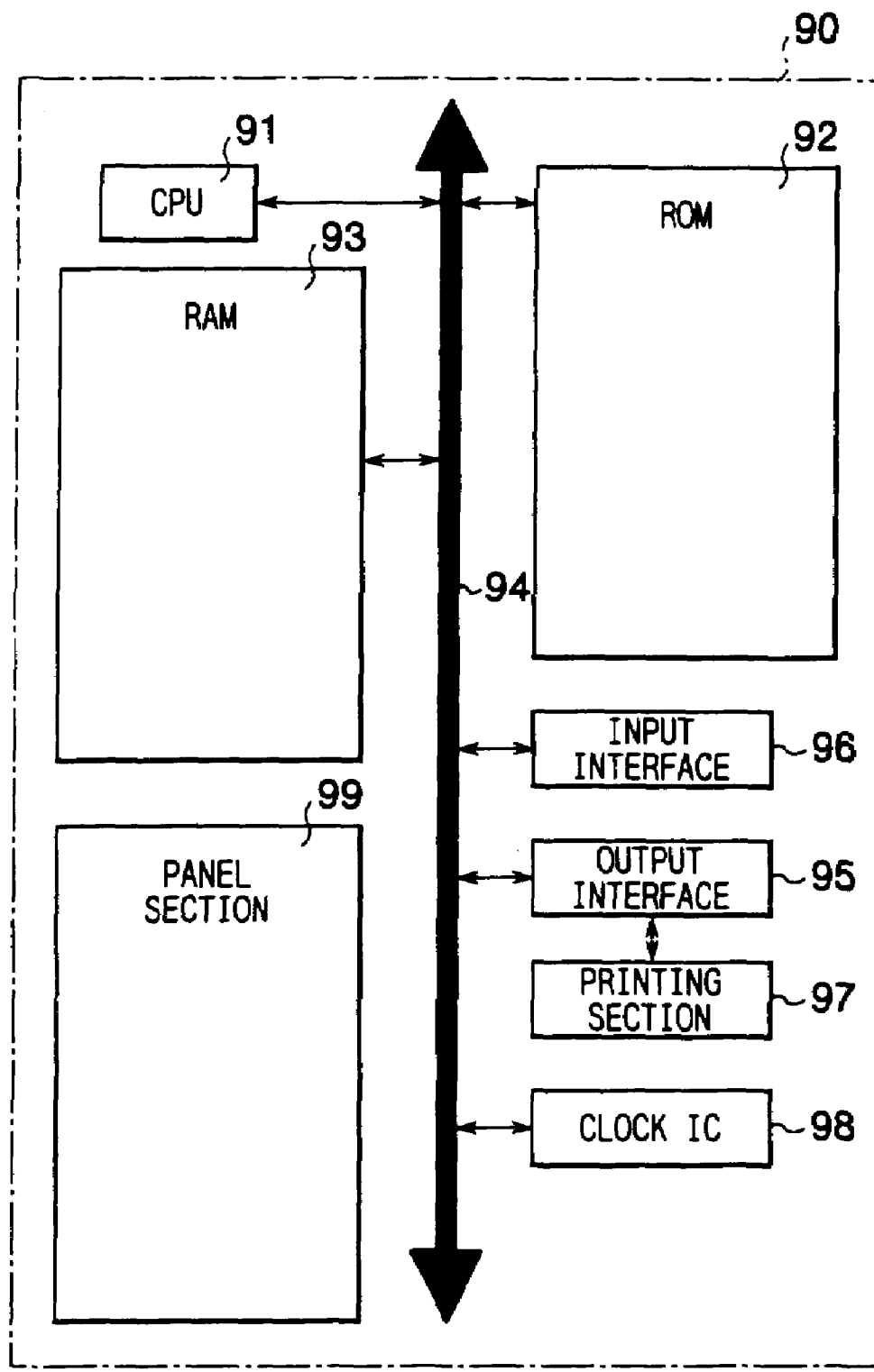
FIG. 2 is a block diagram showing a configuration of a control section in the laser beam printer of FIG. 1.

The laser beam printer 1 further includes a control section 90 shown in FIG. 2. The control section 90 includes a central processing unit (CPU) 91, a read only memory (ROM) 92, a random access memory (RAM) 93, a bus 94, an output interface 95, an input interface 96, a printing section 97, a clock IC 98, and a panel section 99. The CPU 91 controls overall process of the laser beam printer 1. The ROM 92 stores control programs including a log data process program. The clock IC 98 can be omitted as an user desires.

The input interface 96 of the control section 90 is connected to a host computer (not shown) via a network, such as telephone line or local area network, or through a parallel interface or a serial interface. Hence, the laser beam printer 1 can be connected to a single host computer or a plurality of host computers. With this configuration, the control section 90 receives job data from the host computer via the input interface 96.

Figure 3:
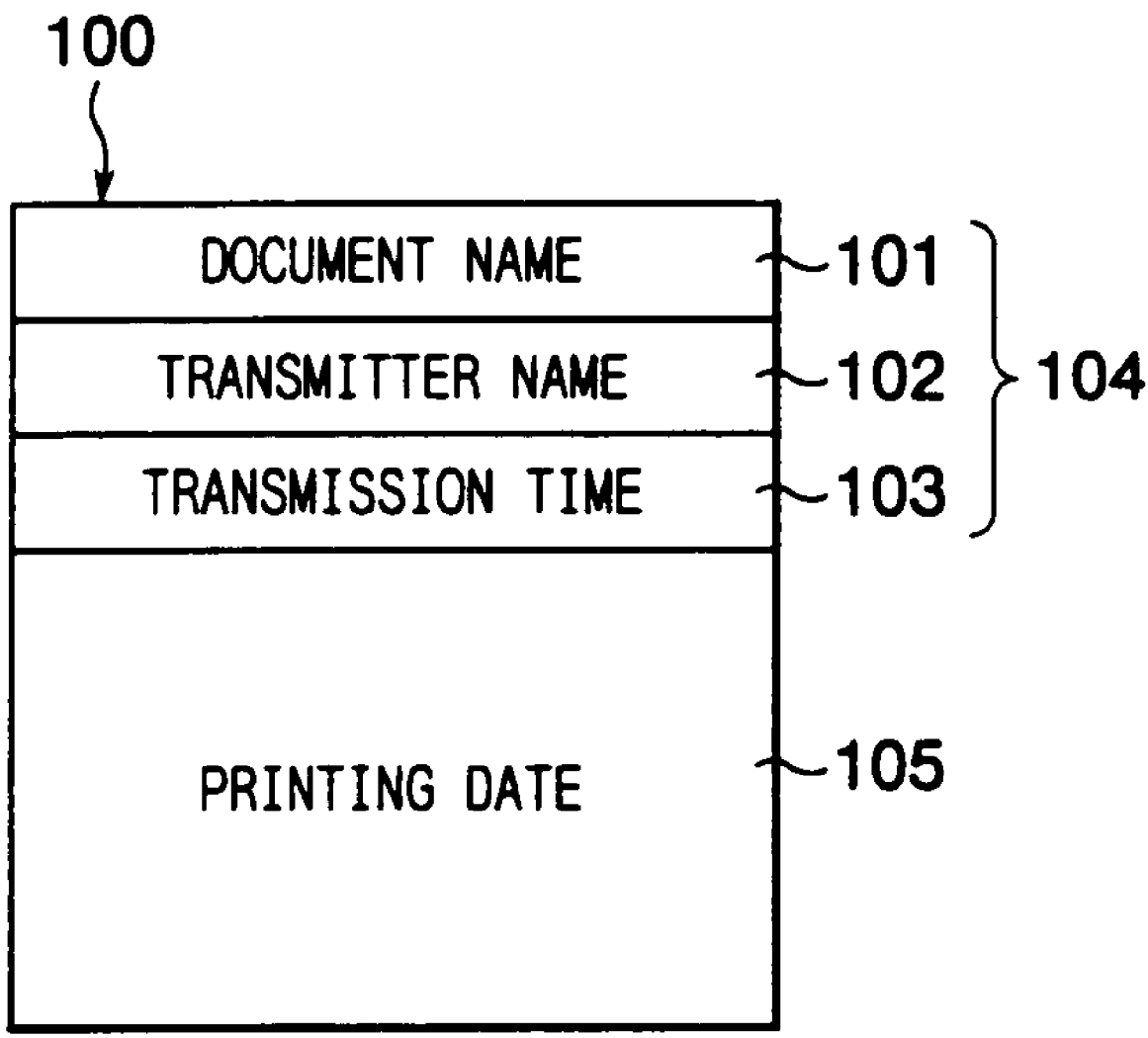
FIG. 3 is an explanatory diagram showing a configuration of job data received in the laser beam printer of FIG. 1.

The job data is generated in and transmitted from the host computer in the following manner. That is, a user of the host computer starts an application program, such as a word processor, and then the user creates a desired document data using the application program. Next, the user selects a printing function from a menu in the application program. Then, a monitor of the host computer displays a print dialog box, enabling the user to set printing conditions and the like, such as document name. When the user makes a selection to begin printing, job data 100 shown in FIG. 3 is created in the host computer. It should be noted that in the present embodiment, it is assumed that the host computer is provided with a clock IC.

As shown in FIG. 3, the job data 100 includes control information 104 and printing information 105. The control information includes a document name information 101, a transmitter name information 102, and a transmission time information 103. The document name information 101 is created based on the document name set by the user using the application program. The transmitter name information 102 is set to a user name previously entered in an operating system of the host computer, such as Windows. The transmission time information 102 is created based on time information read from the clock IC built in the host computer and indicates time and date of when the printing data 105 is created. The printing data 105 is created based on the document data created by the user in the application program.

Then, the job data 100 is transmitted from the host computer to the laser beam printer 1. When the laser beam printer receives the job data 100, then the CPU 91 of the laser beam printer 1 executes printing log data processes. The printing log data processes will be described next while referring to the flowchart shown in FIG. 4. It should be noted that a receiving time information is used as a control information in an example described next.

First, in S1, the CPU 91 of the control section 90 receives the job data 100 and stores the job data 100 into a region of the RAM 93. Next in S2, the CPU 91 extracts the control information 104 from the job data 100 and stores the control information 104 in a different region of the RAM 93. In S3, the CPU 91 determines whether or not the clock IC 98 is mounted in the control section 90. Specifically, the CPU 91 reads a value from a clock IC port. When the CPU 91 reads a predetermined value from the clock IC port, then the CPU 91 determines that the clock IC 98 is mounted. Alternatively, a switch can be mounted to the control section 90, and the CPU 91 can determine by reading settings of the switch.

If the CPU 91 determines that the clock IC 98 is mounted (S3:YES), then in S4, the CPU 91 reads a current time from the clock IC 98 and stores the current time as receiving time information in a prescribed area of the RAM 93. Next in S5, the CPU 91 stores the receiving time information and other information included in the control information 104, that is, the document name information 101 and the transmitter name information 101 in the present embodiment, into a prescribed area of the RAM 93. At this time, the receiving time information and the other information is stored as a part of log information. The log information is used for job management. Then, the process is ended.

On the other hand, if the CPU 91 determines in S3 that the clock IC 98 is not mounted (S3:N0), then in S6, the CPU 91 sets the transmission time information 103 of the received job data 100 as a receiving time information, and stores the receiving time information and other information, that is, the document name information 101 and the transmitter name information 102 in the present embodiment, into the prescribed area of the RAM 93. At this time, the receiving time information and the other information are stored as log information. Then, the present process is ended.

As described above, according to the present embodiment, when the clock IC 98 is provided in the laser beam printer 1, an accurate receiving time information can be stored as the part of the log information. Therefore, a printing order, a deleting order, and other orders can be accurately determined based on the receiving time information. In other Also, even when the laser beam printer 1 is not provided with the clock IC 98, the transmission time information 103 included in the job data 100 transmitted from the host computer is set as the receiving time information. Therefore, in this case also, the receiving time information is stored as a part of the log information, just as when the clock IC 98 is provided. Accordingly, a printing order, a deleting order, and other orders can be accurately determined based on the receiving time information. It should be noted that strictly speaking, a slight time delay occurs between the actual transmission time of job data and the actual receiving time of the job data. However, this time delay is within a range that poses no problem to practical purposes. Therefore, it is possible to perform accurate printing processes based on the order of receiving times.

As described above, according to the present invention, transmission time information included in job data transmitted from a host computer is set and stored as a part of log information. Therefore, a printing device can always perform efficient printing processes and other processes based on the log information, regardless of whether the printing device is provided with a clock IC or not.

While the invention has been described in detail with reference to specific embodiments thereof, it would be apparent to those skilled in the art that many modifications and variations may be made therein without departing from the spirit of the invention, the scope of which is defined by the attached claims.

Figure 4:
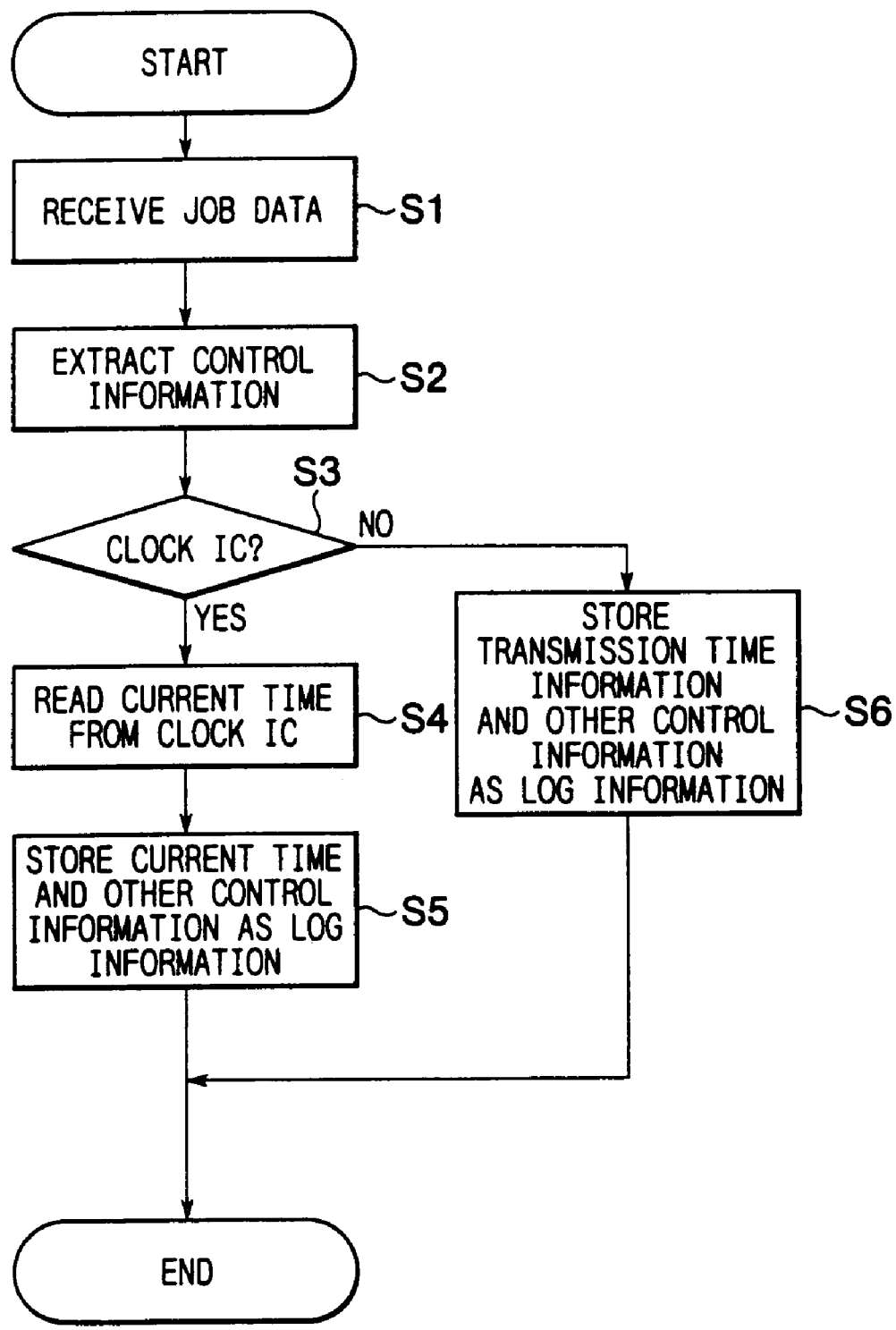
FIG. 4 is a flowchart representing a printing log data process executed in the laser beam printer of FIG. 1.

For example, the determination process of S3 in FIG. 4 can be performed at a time when a power of the laser beam printer 1 is turned ON rather than after S2. In this case, a free-running counter can be configured by a timer built into the CPU 91 or by software. The free-running counter determines whether or not the clock IC 98 is provided or not, every time when the power of the laser beam printer 1 is turned ON. Then, based on the determination made at this time, the processes in S4 and on in FIG. 4 are executed.

Also, in the embodiment described above, receiving time information is set and stored as a part of log information when job data is received. At this time, if a printing device is not provided with a clock IC, transmission time information is set as the receiving time information. Then, the receiving time information is stored as a part of log information that is used for managing printing data. However, the present invention can be applied to a printing device wherein information other than receiving time information is set as control information and stored as a part of the log information. Examples includes error-time information and printing-completion-time information. More specifically, when an error, such as paper jams and running out of toner, occurs, then error-time information is set and stored. At this time, if the clock IC is not provided, then transmission time information included in received job data is set as the error-time information and stored as a part of the log information. With this configuration, error processing can be performed accurately, regardless of whether or not a clock IC is provided to the printing device.

Also, there has been provided a printing device including a function for transmitting an electronic mail to a host computer when printing processes are completed. Usually, such electronic mail includes a message indicating completion of the printing processes and a printing completion time. In this case, transmission time information included in received job data can be set as the printing completion time information, then the printing completion time is stored as a part of log information.

Further, transmission time information included in received job data can be set and stored as transmission time information indicating a time of when the printing data has been transmitted.

Although in the embodiment described above, the present invention is applied to a laser beam printer. However, the present invention can also be applied to other printing device including an ink-jet printer, a facsimile device, a copying machine, and the like.

What is claimed is:

1. A printing device comprising:
   a receiving unit that receives a printing data appended with a time information from an external device;
   a printing unit that is connected to the receiving unit and performs a printing operation to form an image on a recording medium based an the printing data received at the receiving unit;
   a detecting unit that detects whether or not a clock unit exists;
   an information setting unit that sets a control information, wherein when the detecting unit detects that the clock unit exists, the information setting unit retrieves a current time from the clock unit and sets the current time as the control information, and when the detecting unit detects that the clock unit does not exist, the information setting unit retrieves the time information appended to the printing data and sets the time information as the control information; and
   a memory that stores the control information, wherein the printing unit performs the printing operation in response to the control information.

2. The printing device according to claim 1, wherein the memory stores a log information about the printing data, and the memory stores the control information as a part of the log information.

3. The printing device according to claim 2, wherein the information setting unit sets the control information as a printing-data-transmission-time information indicating a time of when the printing data is transmitted from the external device, and the memory stores the printing-data-transmission-time information as the control information.

4. The printing device according to claim 2, wherein the information setting unit sets the control information as printing-start-time information indicating a time of when the printing operation is started, and the memory stores the printing-start-time information as the control time information.

5. The printing device according to claim 2, wherein the information setting unit sets the control information as error-time information indicating a time of when an error occurs, and the memory stores the error-time information as the control information.

6. A control method of controlling a printing device that performs a printing operation, comprising the steps of:
   a) receiving a printing data appended with a time information;
   b) detecting whether or not a clock unit is provided in the printing device;
   c) reading a current-time information from the clock unit if it is detected in step b) that the clock unit is provided;
   d) reading the time information appended to the printing data received in step a) if it is detected in step b) that the clock unit is not provided;
   e) setting either one of the current time information read in step c) or the time information read in step d) as a control information;
   f) storing the control information in a memory; and
   g) controlling the printing operation in response to the control information.

7. The control method according to claim 6, wherein the memory stores a log information about the printing data, and the control information is stored in the memory in step f) as a transmission-time information indicating a time of when the printing data is transmitted, the control information being stored as a part of the log information.

8. The control method according to claim 6, wherein the memory stores a log information about the printing data, and the control information is stored in the memory in step f) as a printing-start-time information indicating a time of when the printing operation is started, the control information being stored as a part of the log information.

9. The control method according to claim 6, wherein the memory stores a log information about the printing data, and the control information is stored in the memory in step f) as an error-time information indicating a time of when an error occurs, the control Information being stored as a part of the log information.

* * * * *